July 5, 1966 M. SCHLICHTE 3,259,694

RESONANT TRANSFER SWITCH CIRCUIT FOR TIME MULTIPLEX COMMUNICATION SYSTEMS

Filed Dec. 18, 1961 2 Sheets-Sheet 1

INVENTOR

MAX SCHLICHTE

INVENTOR
MAX SCHLICHTE 3,259,694

RESONANT TRANSFER SWITCH CIRCUIT FOR TIME MULTIPLEX COMMUNICATION SYSTEMS

Max Schlichte, Munich, Germany, assignor to Siemens & Halske Aktiengesellschaft, Berlin and Munich, Germany, a corporation of Germany Filed Dec. 18, 1961, Ser. No. 160,088
Claims priority, application Germany, Jan. 20, 1961, S 72,142
7 Claims. (Cl. 179—15)

The invention disclosed herein is concerned with switches for use in communication systems, for example, telephone systems, operating in accordance with the time multiplex principle.

In a time multiplex communication system, messages to be exchanged between interconnected parties are in known manner modulated on sequences of pulses which are mutually displaced, thereby permitting multiplex utilization of trunk lines. The above indicated switches are respectively allotted, for example, to subscriber stations for connecting given stations for communication with a so-called multiplex point or multiplex line. The switches involved in given cases are for this purpose synchronously operatively actuated by impulses of mutually displaced impulse sequences of identical impulse frequency. During impulse pauses, such switches are open. Assuming that there is provided a multitude of mutually displaced impulse sequences, the time intervals during which the switches involved in maintaining a connection between two subscriber stations, by the impulse-wise closure thereof, will be considerably shorter than the time intervals during which such switches are open in the pauses between the closures. However, energy can be transmitted over the respective switches only while they are closed, and unless particular measures are taken, the transmission of energy is strongly curtailed by the relatively long time intervals during which the switches are open.

The present invention proposes improvements designed to reduce the curtailment of the transmission of energy.

The various objects and features of the invention will appear in the course of the description which will be rendered below with reference to the accompanying drawings.

FIG. 1 indicates a connection between two subscriber stations which is maintained over a multiplex point or terminal by means of switches of the above noted kind, such switches being in previously known manner provided with reactance networks to reduce the curtailment of the transmission of energy;

Figure 1:
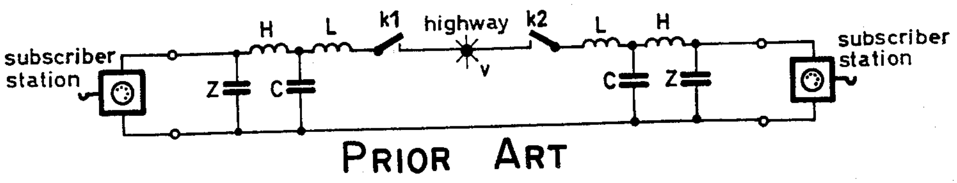

It has been proposed to reduce the curtailment in the transmission of energy by the provision of reactance networks cooperating with the previously noted switches as disclosed in the U.S. Patent No. 2,718,621. FIG. 1 shows a connection between two subscriber stations extending over two such switches provided with reactance networks. The switches are represented by contacts $k1$ and $k2$. The The connection between subscribers $Tln1$ and $Tln2$ is, as pointed out before, effected by periodically and synchronously closing the contacts $k1$ and $k2$. The connection extends over the multiplex point $Mt$. As indicated by the star symbol $v$, further switches having such contacts may be connected with the multiplex point $Mt$. Any two desired contacts can operate as a pair and can be synchronously periodically actuated so as to interconnect subscribers respectively associated therewith.

The reactance networks provided for the respective contacts $k1$ and $k2$ comprise inductances respectively indicated in FIG. 1 by H and L and capacitances Z and C. The inductances L act as series inductances, serving in known manner as oscillation inductances for the purpose of completely transmitting or transferring, upon closure of the contacts k1 and $k2$, the charge on one capacitor C, for example, the one shown at the left of the multiplex point $Mt$, to the other capacitor C shown at the right thereof. The capacitances of these capacitors act as shunt or parallel capacitances. In order to obtain the desired interchange of the charges, the oscillation circuit formed of the coils with series inductance L and the capacitors with the capacitances C are to be tuned so that the period T of its resonance oscillation is, upon closure of the contacts $k1$ and $k2$, twice as long as the closure time of the contacts. Accordingly, $$T-2\pi\sqrt{2L\cdot\frac{C}{2}}=2\pi\sqrt{L\cdot C}=2t$$
$$t=\pi\sqrt{L\cdot C}$$

It may be noted that the period of the above mentioned resonance oscillation is according to these formulas exactly as long as the period of the resonance oscillation of a resonance circuit formed by a coil L and a capacitor C.

The respective circuit elements Z, H and C are to be dimensioned so that they form a low pass filter with a limit frequency which is less than one half of the sequence frequency with which the contacts $k1$ and $k2$ are actuated. The low pass filters will then pass the oscillations resulting from the messages which are to be exchanged, but not the oscillations of higher frequency resulting from the impulse sequences. Accordingly, the oscillations with higher frequency will not reach the two-conductor lines leading to the subscribers and consequently will not cause any disturbances. The wave impedances of the low pass filters are to be matched to the respective two-conductor subscriber lines. Upon satisfying these requirements, there will be obtained very definite values for the various elements of the reactance network cooperating with the respective switches.

Upon using the reactance networks with the circuit elements L, H and K, as shown in FIG. 1, the flow of energy over the switches having the contacts $z1$ and $k2$ will be noticeably less curtailed by the relatively long opening times of the contacts than would be otherwise possible.

The present invention shows a way leading to a further improvement of the operation of such switches.

Accordingly, the invention is concerned with a periodically actuated contact and with a reactance network matched to two-conductor lines which are to be interconnected, comprising a low pass filter, the limit frequency of which is less than half of the frequency with which the switch is operated, and having a capacitor acting as a shunt capacitance and a coil connected with the contact and acting as series inductance, wherein the period of the resonance ocsillation of an oscillation circuit, consisting of the coil and the capacitor, is twice as long as the closure time of the contact. The switch is according to the present invention thereby characterized that the shunt capacitance is maintained at its original value while the coil with the series inductance, connected with the respective contact, is provided in the form of an impulse-forming reactance network containing the shunt capacitance, such network being operative to impart to the current impulse, which is respectively received or transmitted by the switch, an approximately rectangular shape instead of a sinusoidal shape.

The improvement provided by the invention with respect to the known switch resides in reducing the current loading of the respect contact and in facilitating the transmission of energy thereover. These are very important advantages. This is self evident so far as the improved energy transmission is concerned. The reduction of the current loading of the contact is likewise very important. This will be clear upon considering that electronic contacts must be employed in view of the fact that mechanical contacts would wear out quickly in view of the necessary high switching frequency. It is moreover quite questionable whether mechanical contacts could execute the required short switching functions with sufficient exactitude. In the case of electronic contacts, which are constructed with the aid of diodes or transistors, the peak current that may occur is of decisive importance. The costs of structural components rises with the increase of the peak current. It may even happen that suitable components may not be available at all when the peak current is too high. In the case of switches to be considered here, the transmission of energy is crowded into a relatively very short time interval, and the currents along the switching paths are accordingly relatively high. They may amount to a strength a hundredfold the strength of the current delivered from the subscriber stations.

The noted reduction of the current strength is in the case of the mutually cooperating switches obtained by the action of the impulse-forming reactance networks according to the invention. The current impulse transmitted over the contacts disposed between the capacitors has, upon using the impulse-forming reactance networks, an approximately rectangular shape instead of a sinusoidal shape which it otherwise would have. Upon transmitting in a given time interval an identical charge from one to the other side of the respective contacts, the maximum current strength will be appreciably lower in the case of a rectangular current impulse than it would be in the case of a sinusoidal impulse. The use of the impulse forming reactance networks according to the invention results in approximately rectangular impulses and therewith in a reduction of the maximum current strength by over 35 percent.

As already indicated, this results in a further advantage, namely, in the reduction of the damping which occurs in the transmission of the energy. It must be considered in this connection that the switching path of an electronic contact has a given resistance even in its switched-through condition. Accordingly, a part of the energy which is to be transmitted is at the switching path converted into heat, thus entailing energy losses for the transmission. Since the energy converted into heat is at constant resistance proportional to the square of the current strength, the reduction of the maximum current strength results in accordance with the invention in a reduction of the losses and therewith reduction of the damping caused by the corresponding switch. The damping can be reduced by an amount exceeding 15 percent.

The reactance network employed in place of the coil connected with the contact must not change the properties of the low pass filter which properties are decisive for the operation of the switch, namely, the predetermined limit frequency and the wave impedance which is matched to the line connected thereto. In accordance with the invention, the shunt capacitance is therefore maintained at its original value. Observance of this rule will avoid variation of the pertinent properties of the low pass filter by the alteration of the circuit.

The reactance networks to be used in accordance with the present invention may be circuited in various forms.

Figure 2:
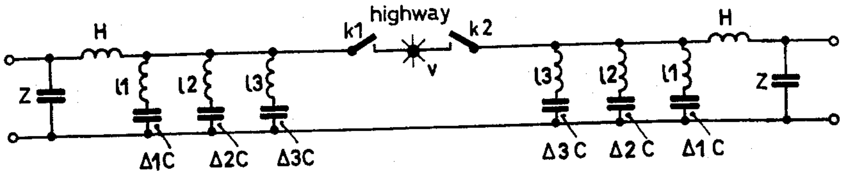
PRIOR ART Fig. 2
FIGS. 2 and 3 show circuits according to the present invention for connections extending over multiplex points.

The impulse-forming reactance network shown in connection with the switches according to FIG. 2 shall be considered first. This network is separately illustrated in FIG. 5.

This network comprises individual series oscillation circuits disposed across to the line, the resonance oscillations of such circuits having respectively a period which is twice as long as odd fractions of the closure times of the contact. In the example shown in FIG. 5, there are provided three such series oscillation circuits. The first series oscillation circuit comprises the coil l1 and the capacitor Δ1C, the second comprises the coil l2 and the capacitor Δ2C, and the third comprises the coil l3 and the capacitor Δ3C. The resonance oscillation of the series oscillation circuits $l1-\Delta 1C$ has the period $$T1=\frac{2}{1}\cdot t$$

the resonance oscillation of the series oscillation circuit $l2-\Delta 2C$ has the period $$T2=\frac{2}{3}\cdot t$$

and the resonance oscillation of the series oscillation circuit $l3-\Delta 3C$ has the period $$T3=\frac{2}{5}\cdot t$$

Further series oscillation circuits may be employed. The shunt capacitance of the capacitor C which would have been present originally (see FIG. 1) is distributed among the capacitors of the series oscillation circuits in such a manner, that the resulting partial capacitances act as the squares of the periods of the resonance oscillations of the respectively cooperating series oscillation circuits. Thus, $$1C:2C:3C \text{ equals } T1^2:T2^2:T3^2 \text{ equals } \left(\frac{2}{1}\right)^2:\left(\frac{2}{3}\right)^2:\left(\frac{2}{5}\right)^2$$

The circuit elements of the series oscillation circuits may be calculated in known manner in accordance with the previously stated requirements.

As is apparent from FIG. 2, the impulse-forming reactance network with the low pass filter, consisting of the series oscillation circuits, is combined with the circuit elements Z, H, C to form a new network, such that it also contains the shunt capacitance C. It has been established by measurements that the limit frequency of the original low pass filter and its wave impedance for the matching to the line are thereby preserved.

Figure 3:
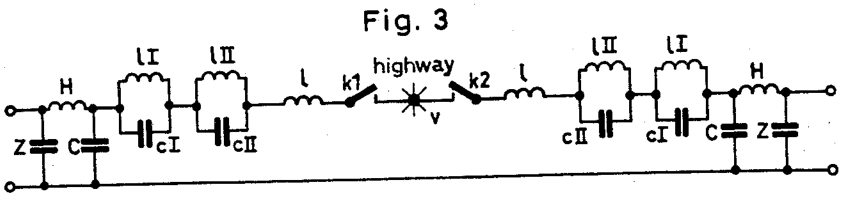
Figure 5:
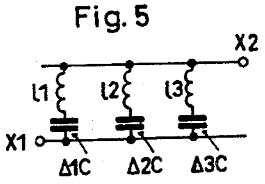
FIGS. 5 and 6 illustrate two equivalent impulse-forming reactance networks apart from the circuits in which they are used.
Figure 6:
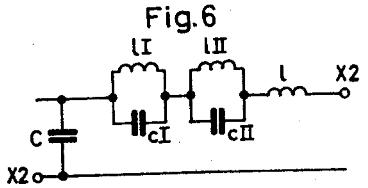

FIG. 6 shows an impulse-forming reactance network, to be used in connection with the switches according to FIG. 3, the circuit of which is somewhat different from the one indicated in FIG. 5. It comprises parallel oscillation circuits and a coil *l* which is disposed ahead of a switch, and also the original capacitor C with unchanged capacitance. In the illustrated example, there are provided the parallel oscillation circuits *lI—cI* and *lII—cII*. As in the previously described reactance networks, there may again be provided more than two parallel oscillation circuits. The more oscillation circuits are provided, the more will the shape of a transmitted current impulse approach the rectangular shape. As mentioned before, the originally provided capacitor is part of this inpulse-forming network which accordingly also contains the shunt capacitance of the original low pass filter. The inclusion of this shunt capacitance in the impulse-forming network results in a blending of the original low pass filter with the impulse-forming network to form a structure in which are preserved the properties of the low pass filter which previously were decisive for its action.

The two impulse-forming reactance networks described so far are for comparison shown side by side in FIGS. 5 and 6. They may be considered in the nature of dipoles lying respectively between the terminals *x*1 and *x*2. The dimensioning of the reactance network shown in FIG. 5, comprising series oscillation circuits, has already been explained. The reactance network shown in FIG. 6 can be calculated, for example, as a network equivalent to the one represented in FIG. 5. This can be done in accordance with the known reactance theorem of Foster, described, for example, in "Pulse Generators" by Glasoe and Lebacqz, 1948, pages 193 and 194.

The results of a calculation example may now be given, applying to a circuit based upon FIG. 5, containing the two series oscillation circuits $l1-\Delta 1C$ and $l2-\Delta 2C$, changed to form a circuit according to FIG. 6, which comprises the capacitor C, the coil $l$ and the parallel oscillation circuit $ll-cl$. From the circuit elements $l1=5.4\mu$h., $\Delta 1C=4.5nF$, $l2=5.4\ \mu$h., $\Delta 2C1=0.5nF$, wherein $\Delta 1C+\Delta 2C=5nF$, are obtained the circuit element $l=2.7\mu$h., $ll=1.14\ \mu$h., $cl=3nF$, and $C=5nF$.

Figure 7:
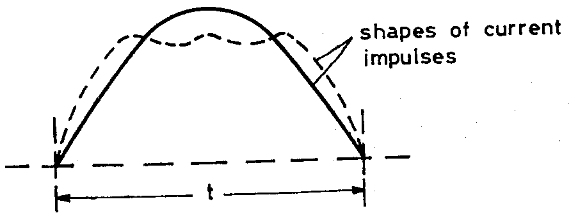
FIGS. 7 to 9 show shapes of current impulses which are ascertainable in connection with different dimensioning of impulse forming reactance networks.

FIG. 7 shows an example of the effect resulting in connection with a switch from the substitution of the series inductance according to the invention. The figure shows for comparison, in full line, the course of a current impulse resulting from the discharge of the capacitor C in connection with a switch according to FIG. 1, the corresponding curve extending sinusoidally for the closure time $t$ of the corresponding contact. Upon termination of the closure time $t$, the contact is opened again. There is also shown, in dash lines, the course of a current impulse for the same contact closure time $t$ as it results in the case of using a pulse-forming reactance network having three oscillation circuits. It will be seen that the shape of this current pulse, as compared with the sinusoidal curve of the original pulse, approximates very much the shape of a rectangular pulse. The areas embraced by the respective curves are substantially identical.

It is now possible, without increasing the circuit means of the pulse-forming reactance network employed, to achieve a further reduction of the operative damping by a few percent. This is obtained by a further equalization or smoothing of the operation of the reactance network, which results in a still more favorable form of the current impulses. There are various possibilities available for this purpose.

Figure 8:
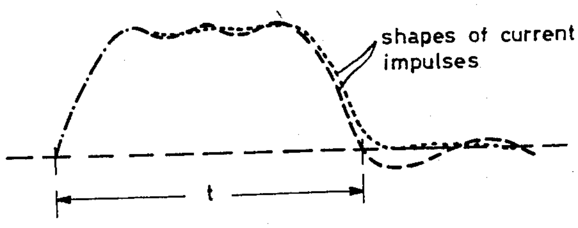

In the first place, a further equalization or smoothing of the oscillation circuits can be effected while preserving the shunt or parallel capacitance. The shunt or parallel capacitance is formed by the partial capacitances of the capacitors Δ1C, Δ2C, Δ3C . . . or it consists of the capacitance of the capacitor C. For the equalization, the outgoing line conductors lying beyond the contacts of the switch, for example, the switch k1, are to be substituted by the wave impedance of the line. Accordingly, a terminal resistor is to be provided in place of the line conductors extending in FIGS. 2 and 3 to the left of the multiplex point Mt and the reactances connected thereat, such terminal resistor corresponding to the wave impedance of the line and interconnecting the two line conductors. An ohmic resistor is to be used for this purpose. The previous condition is to be restored after the equalization so as to put the switch into operation. The equalization as such is to be effected by using as a criterion the discharge operation occurring upon discharge of the capactor C (FIG. 3) or the equally highly charged capacitors Δ1C, Δ2C, Δ3C . . . (FIG. 2) over the terminal resistor. The contact $k$1 is thereby closed for an interval until the discharge operation has decayed, that is, longer than necessary for the otherwise required closure time $t$. This discharge operation is represented in FIG. 8 by the dash line curve. As compared with the closure time $t$ of the rectangular approximation impulse indicated in FIG. 7 in dash line, the discharge operation has a terminal oscillation which starts upon conclusion of the closure time $t$.

It was found that the course of the discharge operation can be changed by the explained equalization so that the terminal oscillation is reduced. The course of the terminal discharge operation resulting thereby is shown by way of example as a dotted curve, in FIG. 8. Upon operating the switch, after the equalization, in the originally intended manner, it will be found that the effective damping has been reduced.

Figure 9:
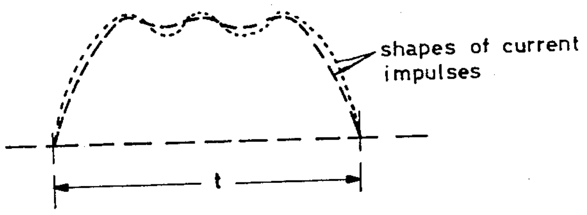

An auxiliary equalization can also be obtained by effecting for the emphasizing of the harmonic oscillations according to FIG. 7, an equalization of the partial capacitances, that is, the capacitances Δ1C, Δ2C, Δ3C . . . of the series oscillation circuits (FIG. 2) in such a manner that the sum of the partial capacitances and the period of the resonance oscillations of the series oscillation circuits containing the partial capacitances, remain unaltered. This kind of equalization alters the $L/C$ ratio in the individual series oscillation circuits. Upon increasing the $L/C$ ratio at the series oscillation circuits which affect the harmonic oscillations, such harmonic oscillations will be emphasized. The quadratic average value of the current $$\frac{1}{t_0}\int_{i^2}^{t}$$

may thereby be decreased for the duration $t$ of a current impulse. The curve for the current impulse resulting after this equalization is by way of example indicated by the dotted curve shown in FIG. 9. The size of the area underneath the dotted curve remains the same. Accordingly, the size of this area is not affected by the equalization. The increase of the quadratic average value signifies a decrease of the operative damping. Such an equalized reactance network can be converted, according to Foster's reactance theorem, into a reactance network with parallel oscillation circuits as shown in FIG. 6.

In the embodiment shown in FIG. 3, there are provided series circuits comprising parallel oscillating circuits and coils, which are respectively disposed ahead of the contacts $k$1 and $k$2. The sequence of the parts of these series circuits is of course as desired. Assuming given conditions, the series circuits belonging to the two switches, can be combined to form a resultant series circuit which is common thereto and to further similar switches, and such combined common series circuit may be centralized, resulting in savings so far as series circuits are concerned. This possibility is given in a system wherein the communication between subscribers is effected over a multiplex line instead of over a multiplex point as explained in connection with FIGS. 1 to 3. The conditions prevailing in such a case will now be explained with reference to FIG. 4.

Figure 4:
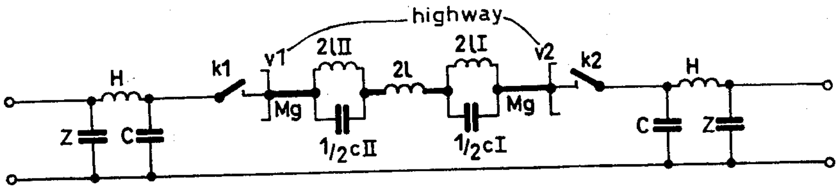
FIG. 4 represents a circuit for connections extending over a multiplex line.

Two groups of switches are included in FIG. 4. The first group comprises the switch indicated by the contact $k$1, such switch being connected to the multiplex line M$g$ at the multiple symbol $v$1, thus also indicating that other similar switches are connected thereto. The second group of switches includes the switch indicated by the contact $k$2 which is one of several switches connected in similar manner to multiplex line M$g$ at the multiple symbol $v$2. Communication between subscriber lines is always effected over the multiplex line M$g$. Subscribers connected to switches of the same group cannot mutually communicate; communication can be effected only between subscribers connected to the two respective groups of switches. This makes it possible to combine the circuit elements disposed in series with the switches $k$1 and $k$2, over which the current impulses are conducted which effect the transmission or transfer of charges between capacitors, so as to form a dipole and to insert such dipole into the multiplex line M$g$. There will thus result, upon closure of the two contacts, a network between these contacts which has the same effect as is obtained in the original circuit arrangement. Owing to the symmetry of the circuit, this is also the case in the event of closure of other similar contacts such as $k$1 and $k$2 which are part of the respective groups of switches. Accordingly, the dipole inserted into the multiplex line M$g$ takes the place of the parallel oscillation circuits and coils extending to the contacts of all switches cooperatively connected with the multiplex line.

The magnitudes of the circuit elements of the resultant dipole are likewise indicated in FIG. 4. The dipole comprises the coil 2*l*, the inductance of which is twice that of the coil 1*l*, the parallel oscillation circuit with the coil 2*l*I the inductance of which is twice that of the coil 1I, and the capacitor 1/2*c*I the capacitance of which is one half the capacitance of the capacitor *c*I. There is also the parallel oscillation circuit with the coil 2*l*II the inductance of which is twice that of the coil *l*II, and the capacitor 1/2II the capacitance of which is one-half of the capacitance of the capacitor *c*II. The magnitudes of these circuit elements can be obtained by elementary procedure.

It is within the scope of the invention possible to employ in place of the impulse-forming reactance networks or parts thereof other equivalent networks in a manner different from that described herein.

Changes may be made within the scope and spirit of the appended claims which define what is believed to be new and desired to have protected by Letters Patent.

I claim:

1. A resonant transfer switching circuit for use in a time multiple communication system, comprising a switch including a periodically operable contact for periodically communicatively interconnecting two-conductor subscriber lines, and an impulse-forming reactance network which is matched to the two-conductor lines, said impulse-forming reactance network having a low pass filter with a limit frequency which is lower than half of the operating frequency of the switch, said network having a plurality of oscillation circuits with different resonant frequencies, each of said oscillator circuits having a period which is related and proportional to the closure time of said switch to develop a wave shape which transfers energy at a relatively constant rate during a substantial portion of the closure time of said switch thereby reducing peak currents traversing said switch, said network forming an equivalent shunt capacitance and an equivalent inductance in series with said contact, said inductance and said capacitance being so dimensioned that their period of resonant oscillation is twice as long as the closure time of the contact.

2. A circuit according to claim 1, wherein said impulse-forming reactance network comprises a plurality of individual series oscillation circuits disposed across the line, the respective series oscillation circuits having a period which is twice as long as odd fractions of the closure time of said contact, the shunt capacitance being distributed with respect to said series oscillation circuits to obtain partial capacitances behaving as the squares of the periods of the resonance oscillations of the respective series oscillation circuits.

3. A circuit according to claim 1, wherein said impulse-forming reactance network comprises parallel oscillation circuits connected ahead of said contact, a coil, and said capacitor.

4. A circuit as set forth in claim 1, wherein said impulse-forming reactance network comprises parallel oscillation circuits connected ahead of said contact, a coil, and said capacitor, said reactance network being dimensioned as a network equivalent to an impulse-forming reactance network comprising a plurality of individual series oscillation circuits disposed across the line, the respective series oscillation circuits having a period which is twice as long as odd fractions of the closure time of said contact, the shunt capacitance being distributed with respect to said series oscillation circuits to obtain partial capacitances behaving as the squares of the periods of the resonance oscillations of the respective series oscillation circuits.

5. A circuit according to claim 2, wherein an additional equalization of the oscillation circuits is effected, with preservation of the shunt capacitance, by ohmically substituting the wave impedance of the line for the conductors thereof which extend from said contact, whereby the discharge course of the similarly charged capacitors, which exhibits as compared with a corresponding approximately rectangular pulse a decaying course, is altered so as to obtain reduction of such decaying course.

6. A circuit according to claim 5, wherein an additional equalization of the partial capacitances of the series oscillation circuits is effected, for emphasizing the harmonic oscillations of the current impulse, without alteration of the sum of the partial capacitances and preservation of the periods of the resonance oscillations of the series oscillation circuits containing the partial capacitances, whereby the average current value is decreased for the duration of a current impulse.

7. A plurality of switch circuits according to claim 3, in which the switches are connected to a multiplex line, thereby characterized that the parallel oscillation circuits belonging to the impulse-forming reactance networks of two switches cooperatively connected over the multiplex line and coils respectively disposed ahead thereof are combined to form a resultant reactance network which is inserted in the multiplex line.

References Cited by the Examiner

UNITED STATES PATENTS

| | | | |
|---|---|---|---|
| 3,062,919 | 1/1962 | Jacob ---------------- | 179—15 |
| 3,073,903 | 1/1963 | Cattermole et al. ------ | 179—15 |

DAVID G. REDINBAUGH, *Primary Examiner.*

R. L. GRIFFIN, *Assistant Examiner.*